United States Patent
Marklund

[11] 3,715,046
[45] Feb. 6, 1973

[54] CARRIAGE WITH VERTICALLY AND HORIZONTALLY SHIFTABLE MAST AND CARRIER

[75] Inventor: Karl Georg Erland Marklund, Skelleftea, Sweden

[73] Assignee: Hiab-Foco Aktiebolag, Hudiksvall, Sweden

[22] Filed: March 10, 1971

[21] Appl. No.: 122,814

[30] Foreign Application Priority Data

March 11, 1960 Sweden ............................. 3207/70

[52] U.S. Cl. .................. 214/674, 214/75 G, 214/670
[51] Int. Cl. ................................................ B66f 9/10
[58] Field of Search ...... 214/14, 660, 670, 674, 75 R, 214/75 G, 730

[56] References Cited

UNITED STATES PATENTS 2,796,180  6/1957  Rose .................................... 214/14
2,679,940  6/1954  Goertz ............................... 214/1 CM Primary Examiner—Gerald M. Forlenza
Assistant Examiner—Lawrence J. Oresky
Attorney—Newton, Hopkins & Ormsby

[57] ABSTRACT

A loading apparatus for handling preferably loads supported on pallets. By means of this apparatus it is possible to lift loads positioned at floor or ground level at either side of for instance a truck, up to the loading platform of said truck and to then deposit said loads in any position on the platform, if desired in a stacked pattern. For this purpose the loading apparatus comprises a carriage movable in the longitudinal direction of the truck platform, a mast movable in the vertical direction relatively said carriage and supporting the lifting tool proper, such as a lifting fork, and a projection arm. The projection arm is arranged for movement in its longitudinal direction perpendicularly to the direction of movement of the carriage and horizontally relatively the carriage frame, and it supports the mast which is arranged for vertical displacement thereon. The mast may be arranged to move in a trolley in the vertical direction and the trolley moves in the horizontal direction of the projection arm. This arrangement provides for loading and unloading in an easy and quick manner and on a minimum of space.

5 Claims, 13 Drawing Figures

INVENTOR
KARL GEORG ERLAND MARKLUND
BY: Newton, Hopkins, & Ormsby
ATTORNEYS

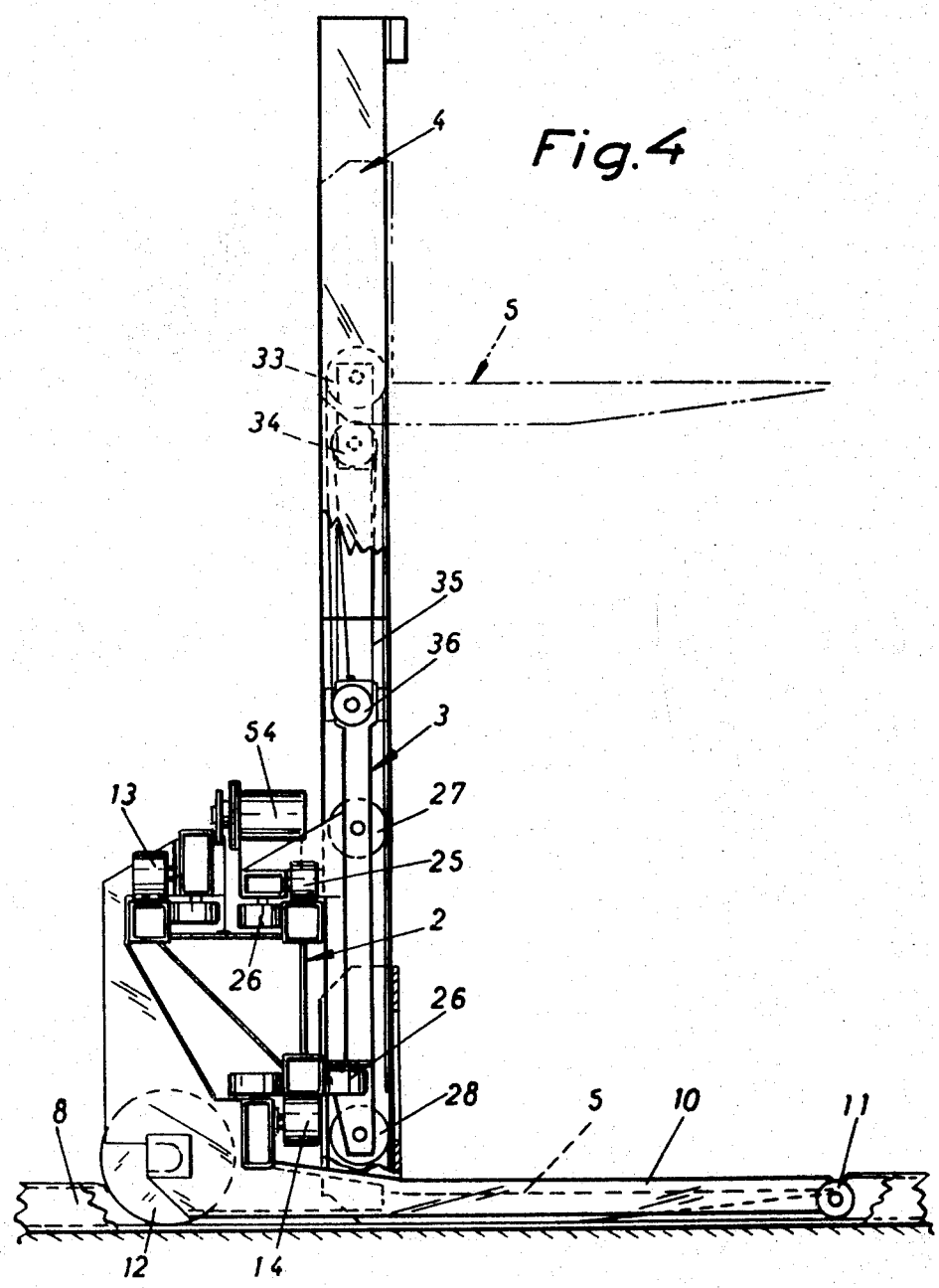

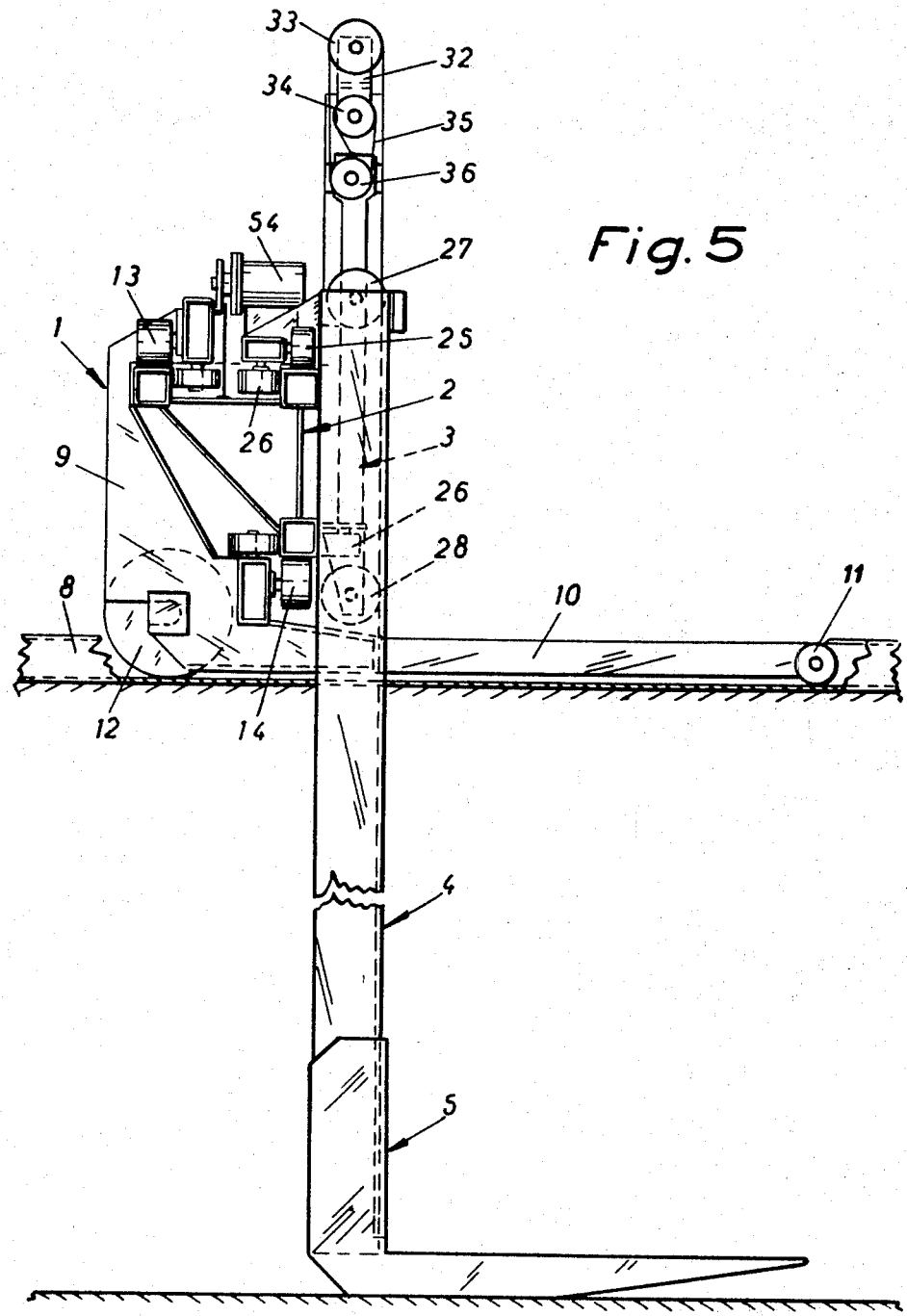

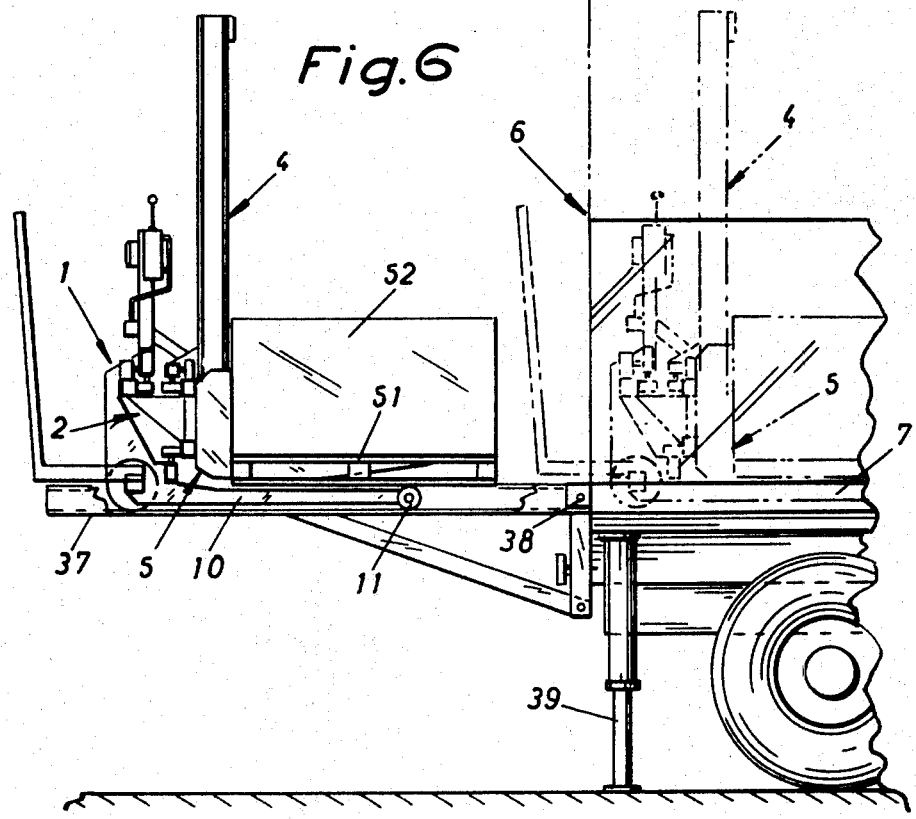
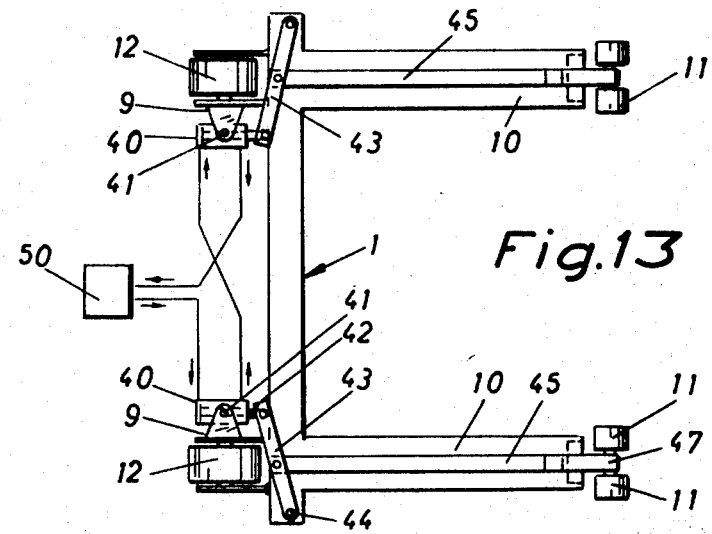

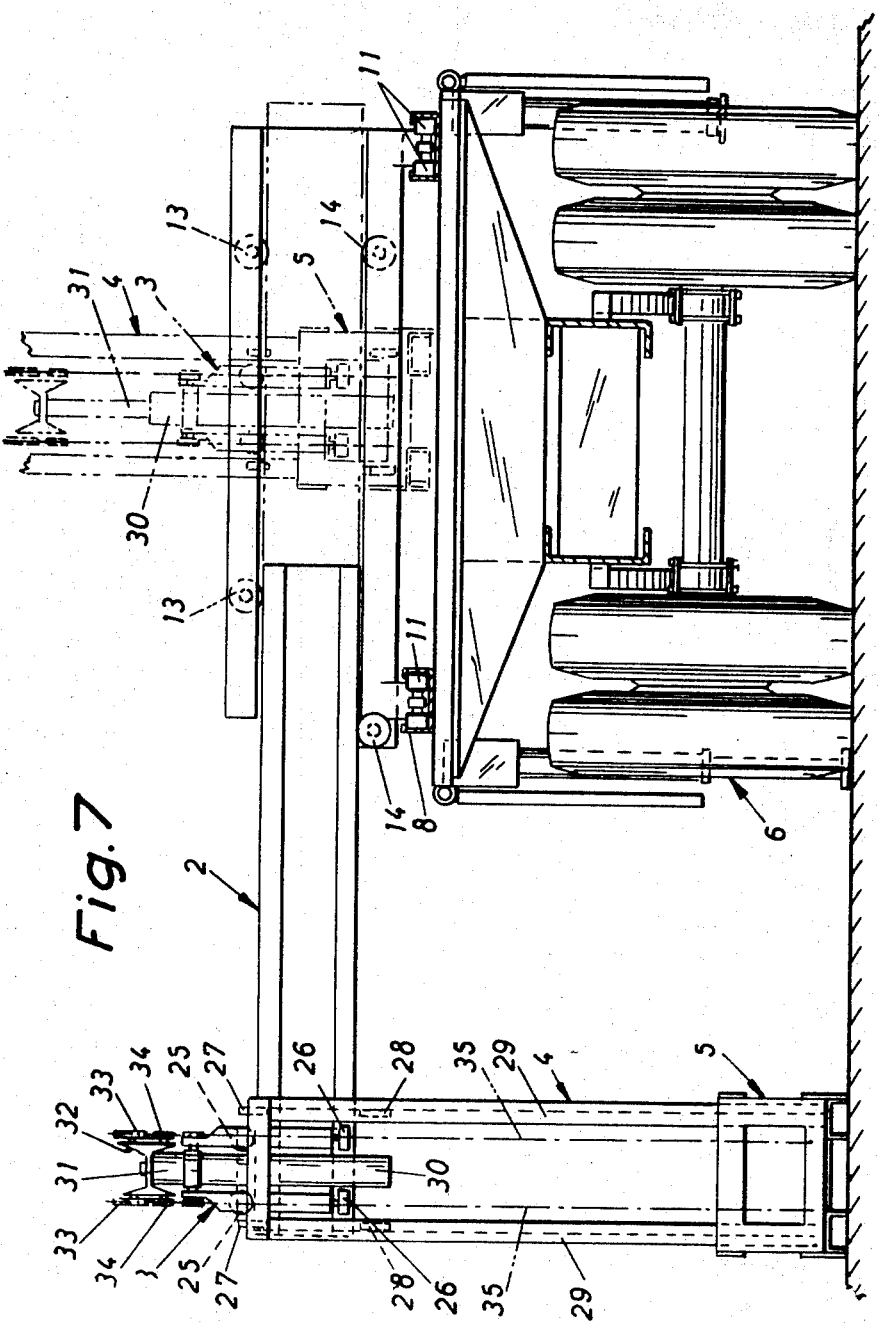

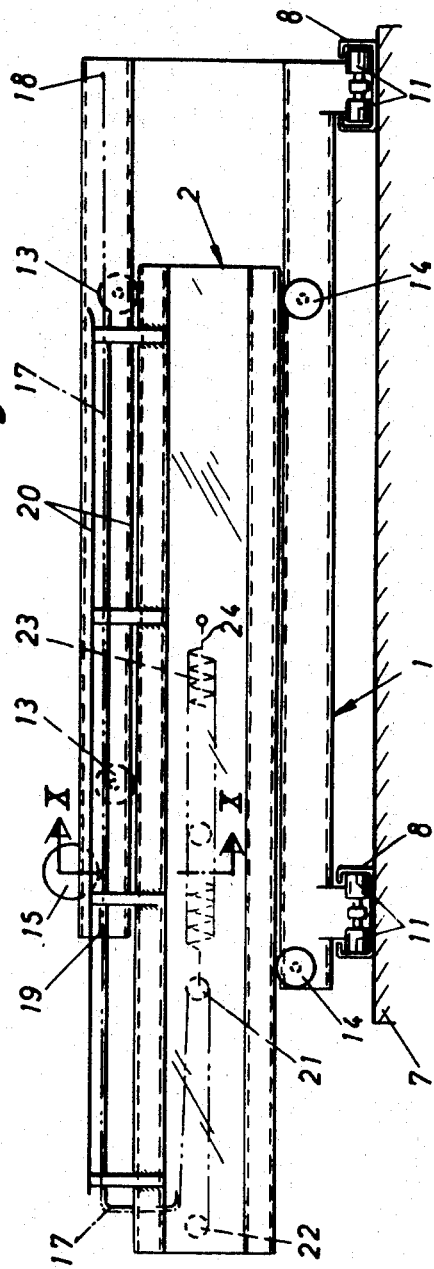

CARRIAGE WITH VERTICALLY AND HORIZONTALLY SHIFTABLE MAST AND CARRIER

BACKGROUND OF THE INVENTION

The present invention relates to a loading apparatus adapted for handling loads supported on pallets. The loading apparatus comprises a mast which is vertically movable relatively a carriage and which is provided with a lifting tool, such as a lifting fork. The loading apparatus is primarily intended to be used for deposition of loads supported on pallets on the loading surface or platform of a covered truck and, after transport at the point of destination, for unloading the goods from said platform without it being necessary to remove the cover (top) of the truck extending above the loading surface.

SUMMARY OF THE INVENTION

Such loading and unloading is made possible in accordance with the present invention which is characterized in that the mast of the apparatus is mounted for vertical displacement on a projection arm, said arm being movable in its longitudinal direction perpendicularly to the direction of movement of the carriage and horizontally relatively the carriage frame.

In accordance with a preferred embodiment of the invention the loading fork is adapted to be lowered to a level below the carriage and raised to a level above said carriage. By means of this loading apparatus it is possible to conveniently and easily transfer articles from ground or floor level onto a loading truck and with the aid of the lifting tool (lifting fork) to deposit them in any position on the platform or for instance stack them in vertical and horizontal rows. The articles to be so transferred may be positioned anywhere on the ground alongside the truck. The unloading may be carried out just as conveniently, and only one single lifting tool is needed.

According to another preferred embodiment of the invention the loading apparatus comprises means for moving the lifting fork along the mast, and also means for releasably securing the mast to the projection arm in such a way that the mast, when secured, is not movable in the vertical direction. This facilitates stacking the goods in several layers when loading and unloading onto and from the truck platform.

BRIEF DESCRIPTION OF THE DRAWINGS

Further characteristics of the invention will become apparent upon reading the following detailed description with reference to the accompanying, partly diagrammatical drawings, In the drawings:

FIG. 4 illustrates on an enlarged scale a side view of a loading apparatus, the apparatus loading fork being in an upper position, FIG. 5 is a view similar to the one in FIG. 4 but illustrates the loading fork and mast in the lower position thereof, FIG. 6 shows on a slightly reduced scale a side view of the loading truck rear, FIG. 7 illustrates on an enlarged scale a rear view of the loading truck with the truck loading fork and mast in their lower position and with the projection arm displaced outwards to one of its end positions.

FIG. 9 is a rear view of the loading apparatus carriage including means for displacement of the projection arm, FIG. 10 is a vertical section, illustrated on an enlarged scale, along line X—X in FIG. 9, FIGS. 11 and 12 are side views, shown partly in vertical section, of the lower portion of the apparatus carriage with means for fitting the same to various positions, and FIG. 13 is a schematic plan view of the carriage including the fitting means.

DETAILED DESCRIPTION OF A PREFERRED EMBODIMENT

Figure 2:
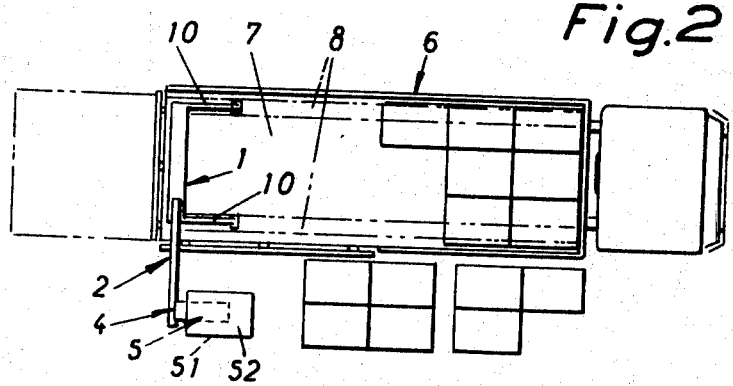
FIGS. 2 and 3 are similar plan views illustrating the loading apparatus in operation.

The main components of the loading apparatus illustrated on the drawings are a carriage 1, a projection arm 2 which is arranged for movement in the lateral direction on said carriage, a trolley 3 which is movable in the longitudinal direction of said arm, a mast 4 which is movable upwards and downwards relatively the trolley, and a lifting fork 5 which is movable upwards and downwards on said mast. The loading apparatus furthermore comprises means for securing the mast 4 in the desired vertical position (height) to the projection arm 2, and means for securing the lifting fork to the mast 4 in the desired vertical position. These securing means which are not specifically illustrated on the drawings since they may consist of securing means known per se, may be operated from a central station, for instance hydraulically or electrically but they may also be manually operable through mechanical means.

The loading apparatus illustrated on the drawings is imagined constructed for use on a loading truck 6 but not limited to such use. The truck loading surface or platform 7 is provided with longitudinal guide rails 8 extending in the lengthwise direction of the platform.

The support frame 9 of the carriage 1 is provided with two, forwardly directed arms 10, each one presenting at its forward end runner wheels 11. At is rear portion, the frame 9 is provided with two motor-operated runner wheels 12 which are mounted in the same vertical plane as are wheels 11. Wheels 11 and 12 run in the guide rails 8 on the truck platform 7. The carriage frame 9 is also provided with guide rollers 13; 14 between which the projection arm 2 is displaceable horizontally in either direction. The carriage is preferably provided with a drive mechanism for moving the projection arm 2 in such a way that one end of the arm projects beyond one side edge of the truck platform 7, and also with a second drive mechanism for moving the projection arm 2 such that its opposite end projects beyond the opposite side edge of the platform 7. In FIGS. 9 and 10 are indicated by reference number 15 a gear drive incorporated in one of the drive mechanisms, the teeth 16 of which (FIG. 10) engage in a roller chain 17 attached at points 18 and 19 to the carriage 1. The chain 17 is maintained in a tightened condition between two parallel guide rollers 20 which are attached in a horizontal position on the projection arm 2. The left part of chain 17 runs freely over a pulley 21 and the left chain end 22 is attached to the projection arm 2. The pulley 21 is attached to the left end of a tension spring 23 and the opposite end 24 of the spring is attached to the projection arm 2. This arrangement makes possible to move the projection arm 2 from its central position to its left end position. A similar arrangement ensures displacement of the projection arm 2 from the central position to the right end position. It is also possible to provide one single drive mechanism by means of which the projection arm 2 may be displaced between its said two end positions.

The trolley 3 is provided with runners 25 and guide rollers 26 for moving it along the projection arm 2. The runners 25 are preferably motor-operated. The trolley 3 is furthermore provided with guide rollers 27, 28 engaging between the flanges of the U-shaped side pieces 29 of the vertically movable mast 4. On the trolley 3 is vertically mounted an hydraulically operated piston and cylinder unit 30, the piston rod 31 of which presents at its upper end a head 32. On this head are mounted two pairs of pulleys 33 and 34, respectively, for two wires 35, one of the ends of these wires being attached to the trolley 3, and the wires further run over pulley 33, another pulley 36 on the trolley 3 and further over pulley 34, and they have the opposite one of their ends attached to the lifting fork 5. This arrangement ensures that upon displacement of the piston rod 31 upwards above the cylinder 30 the lifting fork 5 is moved upwards along the mast 4. Upon retraction of the piston rod 31 into the cylinder 30 the fork 5 is lowered by gravitational force. It is evident that in case the fork 5 is secured to the mast 4, the latter together with the lifting fork will be raised relatively the trolley 3 when the piston rod 31 is displaced upwards. If in this raised position, the mast 4, is secured to the trolley 3, the lifting fork 5 freed from the mast 4 and the piston 31 urged additionally upwards out of the cylinder 30, the fork 5 will move upwards along mast 4.

As illustrated in FIG. 6 the platform 7 of the truck 6 may be provided at its rear end with supporting rails 37 constituting an extension rearwards of the guide rails 8 and being mounted for upwards swinging movement about a horizontal shaft 38. Thanks to this support arrangement the loading apparatus may be displaced backwards to clear the entire platform 7.

Since the loading apparatus supports a rather considerable weight during loading and unloading, a certain inbalance in the load distribution might occur. For this reason the truck chassis is provided with hydraulically operated support legs 39.

Figure 11:
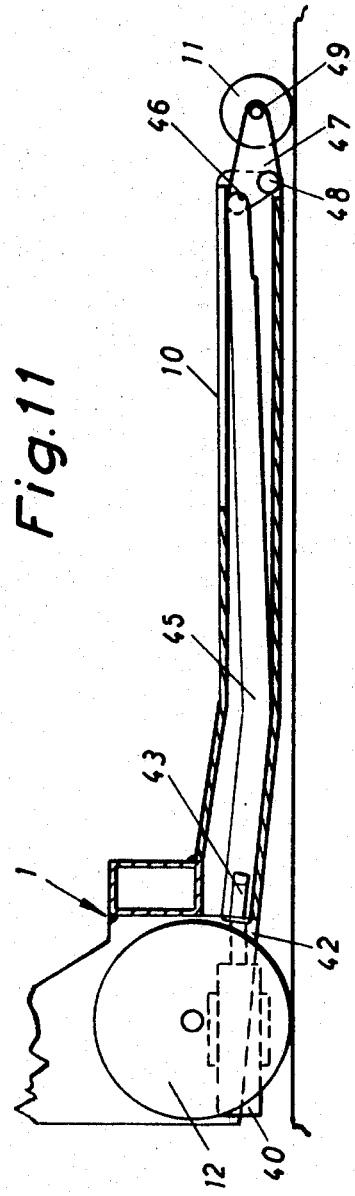
Figure 12:
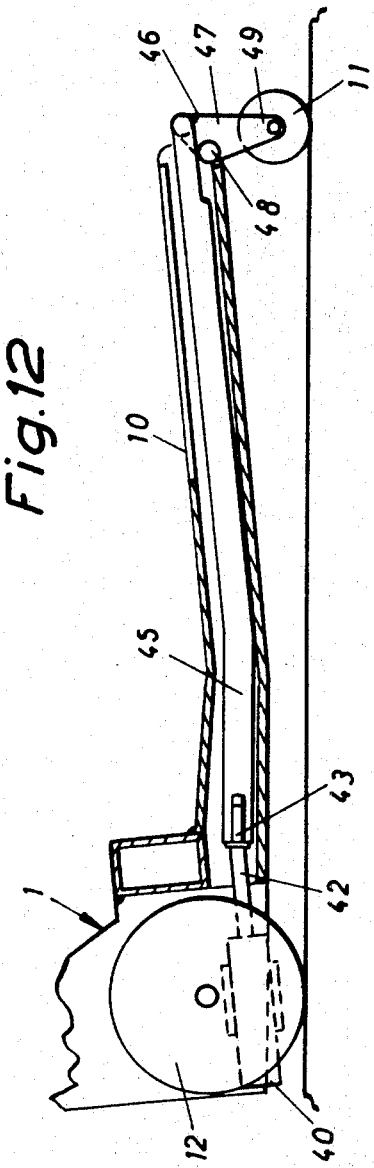

As is clearly illustrated in FIGS. 11, 12 and 13 the carriage 1 is provided with a mechanism for tilting the carriage. The tilting mechanism comprises two hydraulically operated piston and cylinder units 40 which are pivotably mounted about one vertical shaft 41 each on the carriage frame 9. The piston rod 42 of each cylinder 40 has its outer end hingedly connected with the outer end of a one-arm lever 43, and the opposite lever end is pivotably mounted on a vertical pin 44 on the carriage. A link rod 45 hingedly connects the lever 43 to one arm 46 of a two-arm lever 47, said lever being hingedly mounted on a shaft 48 at the forward end of one arm 10 of the carriage 1. The other arm 49 of the lever 47 supports the runner wheels 11. The other carriage arm 10 is equipped in the same way.

When pressure medium is being forced from a source 50 of pressure into the cylinders 40 in the direction indicated by the arrows in FIG. 13, the one-arm levers 43 are swung such that the two-arm levers 47 swing in clockwise direction in accordance with FIGS. 11 and 12, whereby the forward ends of arms 10 are being raised from the position indicated in FIG. 11 to the one illustrated in FIG. 12. The result is a tilting backwards of carriage 1. When the direction of flow of pressure medium is reversed, it is obvious that the carriage is tilted back to its original position. In this tilting movement take part also mast 4 and the lifting fork 5, and it is evident that this tilting arrangement facilitates discharge of goods from the lifting fork 5.

Figure 3:
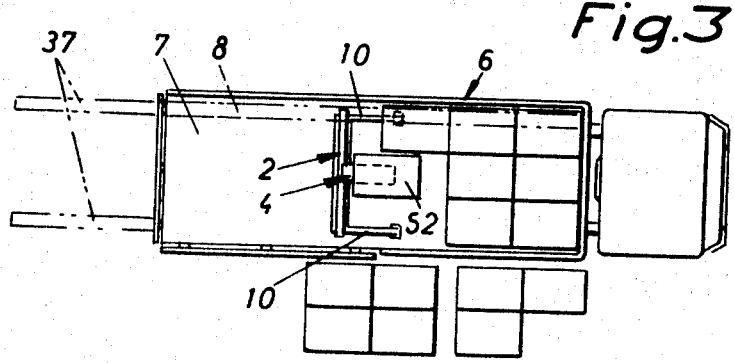

FIG. 2 illustrates the projection arm 3 projecting beyond the right-hand side of the truck 6, and the lifting fork 5 is imagined to assume the lowermost position of said fork, wherein it engages underneath a pallet 51 on which rests the load 52. The lifting fork 5 is imagined secured to the mast 4. When the lifting fork is raised with the aid of the piston rod 31 and the wires 35, the mast 4 is lifted, too. When the lifting fork 5 with the load 52 supported thereon is level with the truck platform 7, the projection arm 2 is retracted, i.e., moves inwards, bringing with it the trolley 3, the mast 4 and the fork 5. The carriage 1 is then moved forwards on the guide rails 8 (FIG. 3) and the loading pallet 51 with the load 52 thereon is deposited in the desired position on the platform. The loading apparatus is then returned to the original position to fetch a new load. Unloading of goods from the truck naturally takes place in the reverse direction.

When the truck 6 is fully loaded, the loading apparatus may accompany the load during transport, resting on the support rails 37. If, on the other hand, it is not desirable to let the loading apparatus accompany the fully loaded truck, it may be separated from the truck and left at the point of loading. To carry out the separation of the apparatus from the truck, the following simple steps are taken. When the trolley 3 is in its middle position (indicated in dash-and-dot lines in FIG. 7) the lifting fork 5 is secured to the mast 4, the fork together with the mast are lowered to ground level and the mast secured to the projection arm 2. When the truck is thereafter driven forwards, the loading apparatus remains standing on the ground supported by the fork 5 and the mast 4. It might be suitable to use a lifting jack to support the loading fork 5 during the deposit of the loading apparatus, this lifting jack being further useful to conveniently lift the entire loading apparatus onto the guide rails 8.

The support rails 37 may be folded upwards against the rear end of the truck when the loading apparatus has been deposited on the ground. The support rails 37 may also form part of the rear flap of the truck (FIG. 2).

It is evident that with the aid of the rearwardly directed support rails 37 it becomes possible by means of the apparatus in accordance with the invention to conveniently load and unload even trucks having a cover extending above the entire platform 7.

Figure 1:
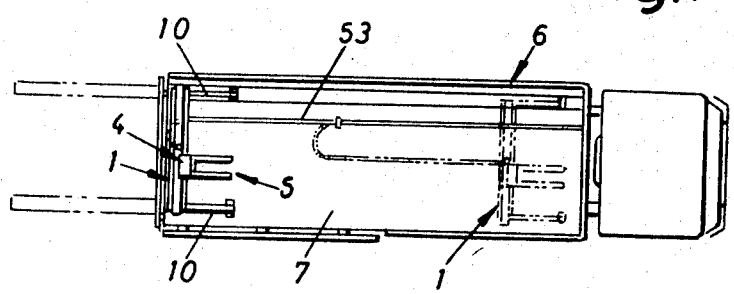
FIG. 1 is a plan view of a loading truck provided with a loading apparatus in accordance with the invention.
Figure 8:
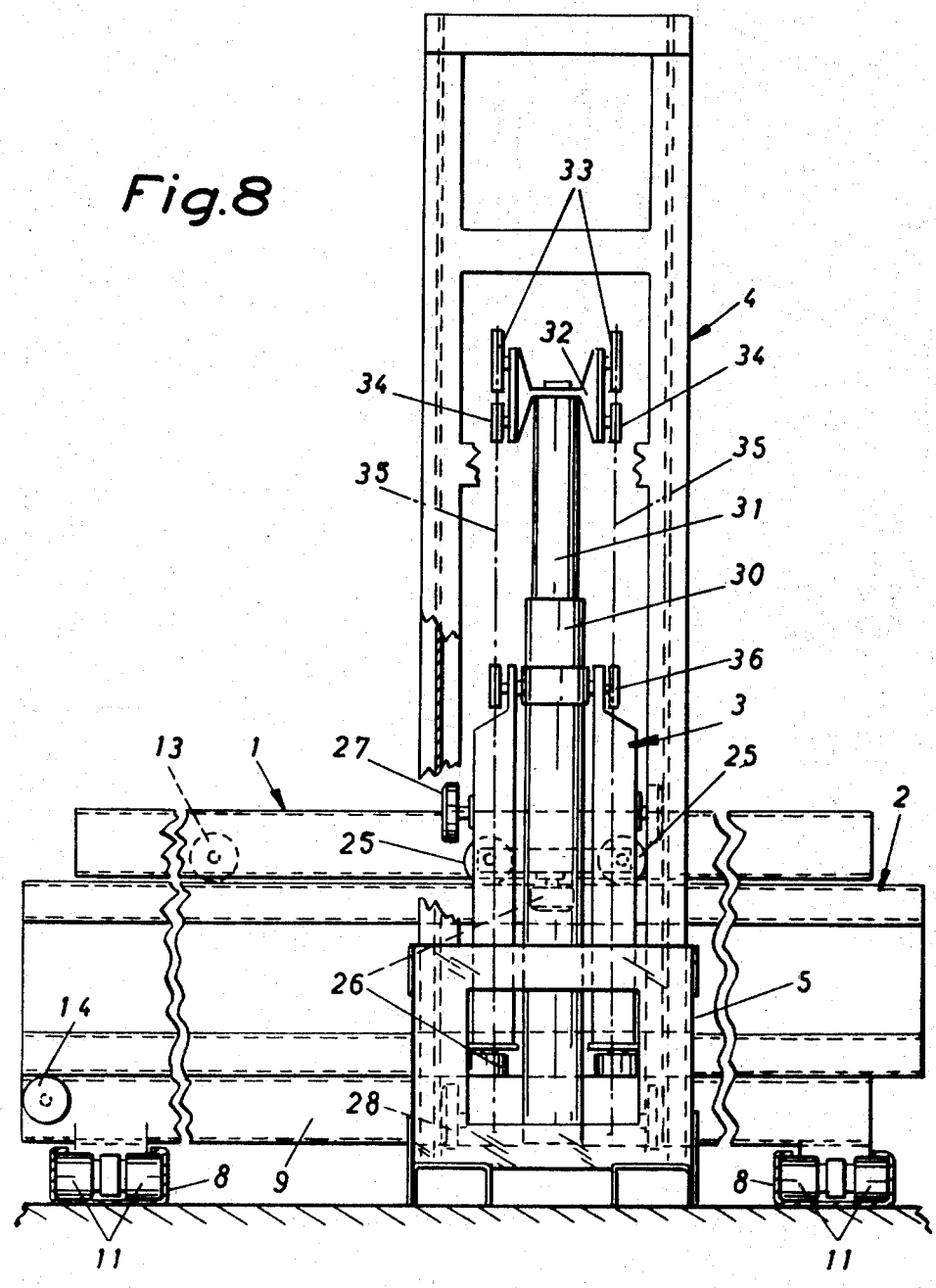
FIG. 8 shows on a still larger scale the loading apparatus with its loading fork and the mast in lifted position.

The embodiment as shown and desired is to be regarded as an example only, and the various parts of the loading apparatus may be constructively altered in various ways without departing from the scope of the appended claims. The invention is not limited to application to loading apparatuses intended to be used solely in connection with trucks, but may be used also with other types of vehicles. In fact, it is not at all necessary to use the apparatus in connection with vehicles of any kind. It may, for instance, be driven on stationary equipment, such as on quays in harbors or in warehouses or other storage premises. Several different arrangements for driving the carriage 1 and for the horizontal displacement of the projection arm 2 as well as for the vertical displacements of the mast 4 and the lifting fork 5 are possible within the scope of the invention. As indicated in FIG. 1 an oil pressure line 53 may be drawn below the truck platform 7 from an hydraulic pump (not shown) at the front portion of the vehicle to a number of hydraulic motors 54 (only one is illustrated in FIG. 5) and to the hydraulically operated piston and cylinder unit 30. The means for displacing on the one hand the lifting fork 5 along the mast 4, and on the other for displacing the mast vertically relatively the projection arm 2 and, possibly also the projection arms 2 horizontally on the carriage 1, preferably are hydraulically operated piston and cylinder units.

The lifting fork 5 may be replaced by some other lifting tool, for instance one provided with clamping legs or a lifting hook.

What I claim is:

1. A loading apparatus comprising a carriage, a projection arm connected to said carriage for sliding movement relative thereto in a horizontal direction perpendicular to the direction of movement of said carriage, a mast mounted on said projection arm and arranged for vertical displacement thereon, a fork supported on said mast, two forwardly directed arms arranged on said carriage, a two armed lever pivotally mounted on the forward end of each of said arms, a runner wheel supported on one lever arm of each of said two armed levers and a preferably hydraulically driven rod system for turning the other lever arm of each of said two armed levers in a vertical plane, this turning movement causing a corresponding degree of tilt of the frame of the carriage, the mast and the fork.

2. A loading device as in claim 1 further comprising a trolley movable along said projection arm, said mast being arranged for vertical movement on said trolley.

3. A loading apparatus comprising a carriage, a projection arm mounted on said carriage for sliding movement in a horizontal direction lengthwise of said arm and perpendicular to the direction of movement of said carriage, a trolley mounted on said projection arm for movement therealong, a mast supported for vertical movement on said trolley, a lifting tool supported on said mast, and drive means for effecting the horizontal movement of said projection arm, said drive means comprising a chain supported on said projection arm, guide rollers engaging said chain on opposite sides thereof, and a drive wheel mounted on said carriage and having teeth engaging in said chain.

4. A loading apparatus as in claim 3 wherein said trolley is provided with drive means for displacing said mast vertically.

5. A loading apparatus as in claim 4 wherein said drive means comprise a hydraulically operated piston and cylinder unit on said trolley, pulleys supported on the piston rod of said piston and cylinder unit, and wires arranged to run in said pulleys, one end of said wires being attached to said trolley and the opposite end of said wires being attached to said lifting tool.

* * * * *